United States Patent [19]

Lorenzo

[11] Patent Number: 4,659,939
[45] Date of Patent: Apr. 21, 1987

[54] OPTICAL SCANNING SYSTEM INCLUDING AN AMPLIFIER

[75] Inventor: John L. Lorenzo, Southbury, Conn.

[73] Assignee: Pitney Bowes Inc., Stamford, Conn.

[21] Appl. No.: 770,127

[22] Filed: Aug. 28, 1985

Related U.S. Application Data

[63] Continuation-in-part of Ser. No. 726,745, Apr. 24, 1985, abandoned.

[51] Int. Cl.$^4$ .............................................. G06K 7/10
[52] U.S. Cl. ........................... 250/566; 250/214 RC
[58] Field of Search ............... 250/206, 214 A, 214 R, 250/214 KC, 561, 566; 307/311

[56] References Cited

U.S. PATENT DOCUMENTS

4,445,031  4/1984  Kamoshida ..................... 250/561 X

FOREIGN PATENT DOCUMENTS

0208676  11/1984  Japan ................................. 250/566

Primary Examiner—Eugene R. LaRoche
Assistant Examiner—Robert J. Pascal
Attorney, Agent, or Firm—Robert H. Whisker; Melvin J. Scolnick; David E. Pitchenik

[57] ABSTRACT

An optical scanning system including an amplifier which automatically adjusts the background reference level. A photodetector, which is preferably a photocell, detects light reflected from or transmitted through objects such as code markings on forms and produces an output signal representative of the intensity of the detected light. This signal is coupled to the differential input of an amplifier through two circuits. One circuit rapidly couples the signal to one of the inputs and the second circuit couples an integral of the signal to the second input to automatically establish a background reference level. The amplifier may include means for adjusting the amplifier sensitivity and a small amount of positive feedback to increase the amplifier hysteresis so that once an object is detected, the amplifier output is unafffected by small changes in the input signal. This embodiment is useful in applications such as proximity detection. In one embodiment of the invention the light source used is an incandescent light having a broad spectrum output which is powered at an audiofrequency greater than 60 hertz chosen with respect to the thermal time constant of the light and the response time of the photodetector so that variations in light output at the operating frequency do not affect the amplifier output. In another embodiment a visible display of the amplifier output is provided so that service technicians may easily adjust the amplifier sensitivity.

8 Claims, 5 Drawing Figures

OPTICAL SCANNING SYSTEM INCLUDING AN AMPLIFIER

RELATED APPLICATIONS

This application is a continuation-in-part of copending application, Ser. No. 726,745, for: OPTICAL SCANNING SYSTEM INCLUDING AN AMPLIFIER, filed: Apr. 24, 1985, now abandoned.

BACKGROUND OF THE INVENTION

This invention relates to Optical Scanners, and more particularly to a circuit for detecting differential changes in the output of a photocell or other optical transducer.

Photodetection of indicia on forms and the like is known. In such systems a narrow beam of light is focused as a spot or slit of light on the relevant field to be scanned and is moved over the field, either by the deflection of the beam or movement of the form. Light reflected from, or transmitted through, the form is focused on a photocell or other photodetector so that indicia may be detected as variations in the photocell output. Typically, photocell outputs are small so that the photocell is connected to an amplifier and the amplified output is further processed by the system.

One application of photodetection is in the control of Computer Output Mailing Systems (COMS). Such systems receive fan-fold computer printout, separate the printout into discrete documents, assemble the documents and other materials into batches to be mailed together, and insert the batches into envelopes. Such COMS are typically controlled by information encoded on "control documents" as "dash codes". "Dash codes" consist of lines, normal to the direction of motion of the printout, which are printed on the control document, typically on the sprocket strips of the printout. The field containing the "dash codes" is scanned by reflected light as the document is received by the COMS and the presence or absence of lines encodes information defining the operations relating to that control document.

Scanning such computer printout is complicated by the fact that the color or shade of the printout may vary from job to job, changing the background or reference level against which the "dash codes" must be detected. Also, the intensity of the light source used may vary with time shifting the signal levels produced by the photodetector.

Heretofore compensating for these problems has required complex calibration circuits and/or frequent adjustments by an operator. Typical of the prior art circuits is that disclosed in U.S. Pat. No. 4,064,833 GLUCK et al issued Dec. 27, 1977; wherein a circuit comprising a second photodiode for monitoring the lamp intensity is disclosed.

Thus, it is an object of the subject invention to provide an optical scanner system and an amplifier for use in such system which are suitable for the detection of objects having a wide spectrum of colors against a wide spectrum of background colors and types. It is another object of the subject invention to provide such a system and amplifier which compensate for changes in illumination intensity.

It is still another object of the subject invention to provide such a system and amplifier which achieve the above objects without the need for operator intervention.

It is still another object of the subject invention to provide such an amplifier wherein the amplifier sensitivity may be easily adjusted.

It is still another object of the subject invention to provide such an amplifier which may incorporate a degree of hysteresis so that the amplifier output having shifted to indicate the detection of an object that output will tend to retain its present state, despite small changes in the amplifier input, until the input clearly returns to the background level. Such hysteresis is desirable for amplifiers used in systems intended to detect threshold levels in relatively slowly changing signals (e.g., proximity detection of approaching objects) but is not desirable in systems intended to detect rapidly changing low level signals (e.g., low contrast dash codes.)

BRIEF SUMMARY OF THE INVENTION

The above objects are achieved and the disadvantages of the prior art are overcome by means of an optical scanning system which includes a light source, a first lens which focuses the light, apparatus for sequentially passing objects to be scanned through the focused light, and a photodetector which responds to light reflected from, or transmitted through, the objects to produce an output representative of that reflected or transmitted light. The output of the photodetector is coupled to an amplifier having differential inputs and an output. The photodetector output is coupled to one amplifier input through a first circuit which rapidly couples the photodetector output, and to the second input through an integrator circuit. Thus, while the first input closely follows the photodetector output the second input is held at a level proportional to an integral of the photodetector output to establish a background reference level. The time constant of the integrator circuit is chosen so that the second input remains substantially at the background level during the detection time.

In a preferred embodiment a potentiometer is connected to the second amplifier input to provide a bias. The sensitivity, or threshold, of the amplifier maybe adjusted by adjustment of the potentiometer.

In another preferred embodiment the hysteresis of the amplifier maybe increased by feeding back the output to the second input by connecting the output to the top of the pontentiometer.

In still another preferred embodiment an incandescent light is used as the light source to provide a broad spectrum light output.

In still yet another preferred embodiment of the subject invention power to the incandescent light is provided at an audio frequency, above 60 hertz, chosen with respect to the thermal time constant of the light so that variations in light output at the power frequency are not coupled into the amplifier.

Upon consideration of the subject invention, those skilled in the art will recognize that by using commercially available integrated circuits the amplifier of the subject invention may be produced in a package small enough to be physically mounted in the scanner head of a system. This advantageously provides an output signal at the scanner head which is logic level compatible; significantly reducing or eliminating noise and interference problems in transmitting the output signal back to the control logic of the system. Other objects and advantages of the subject invention will be apparent to those skilled in the art from consideration of the attached drawings and the detailed description set forth below.

DETAILING DESCRIPTION OF PREFERRED EMBODIMENTS OF THE SUBJECT INVENTION

Figure 1:
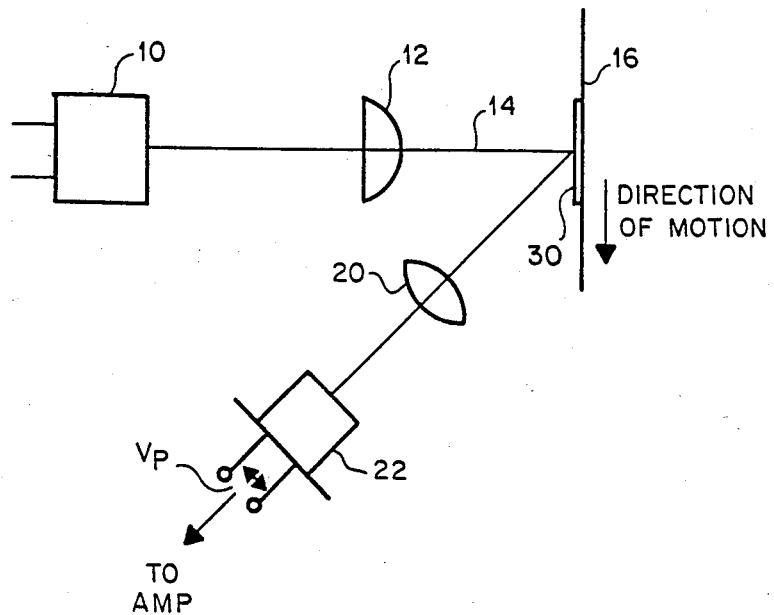
FIG. 1 is a schematic representation of the optical portion of a prior art scanning system.

FIG. 1 shows a typical optical portion of a scanning system as is known for use in COMS systems. A light source 10 emits light which is focused by lens 12 into a narrow slit of light 14 projected on to document 16. Light reflected from document 16 is refocused by lens 20 and detected by photodetector 22. Photodetector 22 is typically a photocell which generates an output voltage $V_p$ in response, and in proportion, to the incident light.

Figure 2:
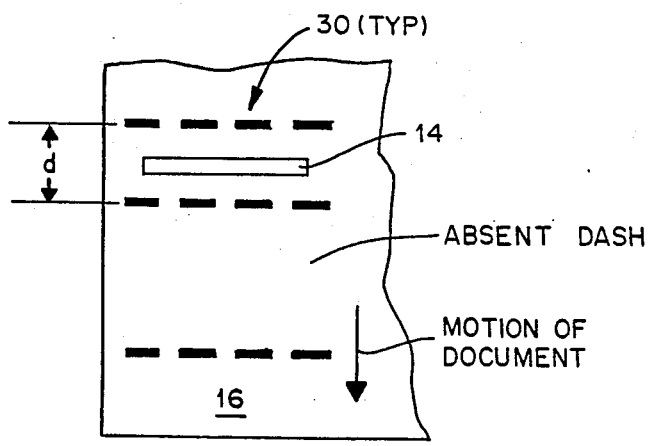
FIG. 2 is a plan view of a portion of a document showing the arrangement of the "dash codes" and scanning beam of light.

FIG. 2 shows a plan view of a field of a control document on which information has been encoded in the form of "dash codes". "Dash codes" are encoded by the presence or absence of dashes 30 which are printed on document 16 by the computer output printer. Dashes 30 consist of simple lines of typographical characters such as hyphens, asterisks, or (typographical) dashes. Dashes, if present, are spaced at a predetermined distance d, which is preferably approximately from 0.1 to 0.17 inches.

Figure 3:
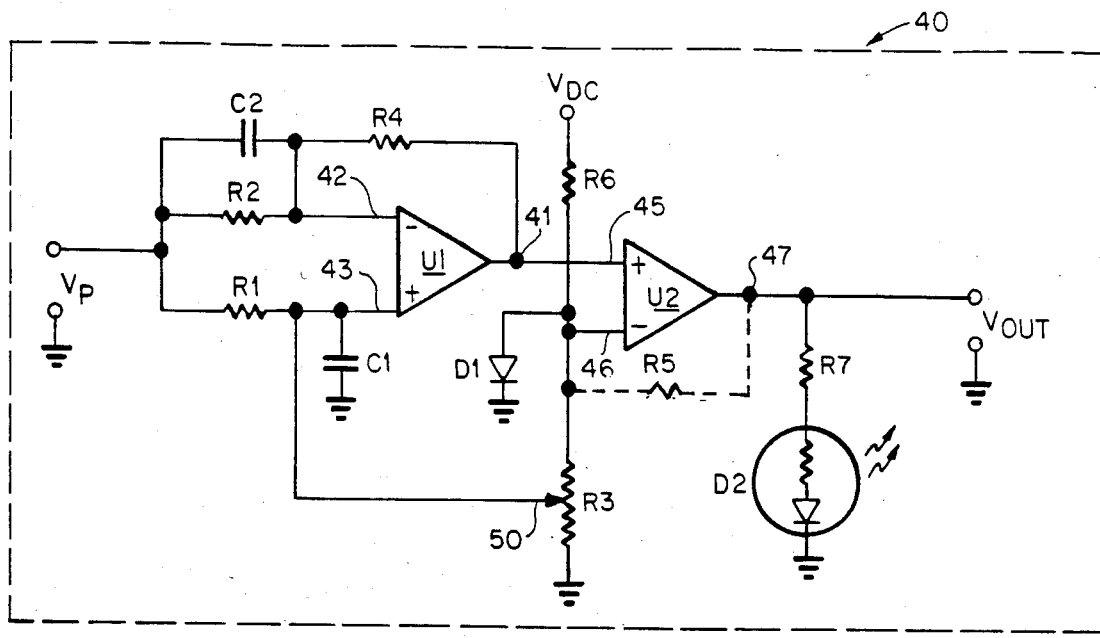
FIG. 3 is a schematic diagram of an amplifier in accordance with the subject invention.

FIG. 3 shows a schematic of a preferred embodiment of the amplifier of the subject invention. (ground and power supply connections for amplifiers $U_1$ and $U_2$ have been omitted for the sake of clarity). Component values are set forth in Table 1 below. Component values are nominal plus or minus standard commercial tolerances (5-10%) unless otherwise indicated.

TABLE 1

C1 0.0068 microfarads
C2 0.056 microfarads
R1 75 kilohms
R2 75 kilohms
R3 500 kilohm potentiometer
R4 7.5 megohms
R5 10 kilohms (optional)
R6 20 kilohms
R7 1.5 kilohms D1 is a conventional signal diode with $V_{FWD}$ approximately equal to 0.5 volts.

D2 is an LED module with current limiting resistor, such as a Hewlett Packard 6620.

U1 and U2 are integrated circuit operational amplifiers; preferably Texas Instrument Model TLC27M2RAD as described in *Linear Circuits Databook*, Texas Instruments, Dallas, Tex. (1984).

Figure 4:
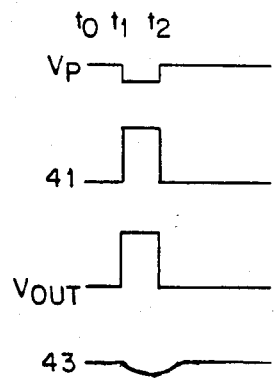
FIG. 4 is a timing diagram of signal levels at various points in the circuit of FIG. 3.

The operation of amplifier 40 will be described with respect to FIG. 3 and the timing diagram of FIG. 4. At time $t_0$ assume that light beam 14 has been focused on background areas of document 16 for sufficient time for output $V_p$ of photodetector 22 to have charged capacitor C1 through resistor R1. (Photodetector 22 is preferably an Optek Model K7350 described in *Optoelectronic Components*, Optek, Div. of Crown Semiconductor, Inc., McKinney, Tex. (1983). Thus, input 42 of amplifier U1 is at $V_P$ and input 43 is slightly lower by virtue of potentiometer R3 and output 41 is substantially at ground. At time $T_1$ light beam 14 encounters a dash and output $V_P$ drops. This drop is rapidly coupled through capacitor C2 to pin 42 and maintained through resistor R2 while the time constant R1C1 holds pin 43 substantially at the previously established reference level. Since pin 42 is the inverting input of U1, a positive going output appears at pin 41. Feedback resistor R4 is chosen to provide a significant degree of amplification, preferably approximately a gain of 100, through amplifier U1. Output 41 is connected directly to non-inverting input 45 of amplifier U2 providing a positive going $V_{out}$ on pin 47. Optional feedback resistor R5 is chosen to provide a substantially unity gain through amplifier U2 and provides a slight amount of positive feedback to increase hysteresis for amplifier 40. If the contrast of the dashes is low, amplifier 40 may "lock-up" due to the positive feedback. In this case, resistor R5 may be substantially increased in value, or eliminated altogether, to limit the positive feedback to that provided by the internal compensation of amplifier U2.

Though it is within the contemplation of the subject invention to use only a single operational amplifier in amplifier 40, by connecting diode D1 to input 46 of U2 low level noise may be more easily "clipped" from the signal after it has been amplified by amplifier U1.

The sensitivity, or threshold, of amplifier U1 maybe adjusted by adjusting wiper arm 50 of potentiometer R3 which is connected to non-inverting input 43 of amplifier U1. One end of potentiometer R3 is held at a level of approximately 0.5 volts by diode D1 which is connected to $V_{DC}$ through resistor R6, while the other end is connected to ground. Since the reference output of photodetector 22 is approximately 350 millivolts by adjusting wiper 50 below this reference level the sensitivity of amplifier U1 maybe decreased while adjusting it closer to this reference level will increase the sensitivity.

A service technician may use LED D2 to easily adjust the sensitivity without need of instruments. The technician need only run a long string of "dash code" through the system and adjust potentiometer R3 to the points where LED D2 is constantly on and is constantly off, noting both positions. By then moving wiper 50 to the middle of those points, the technician may easily adjust the sensitivity of amplifier 40 with substantial accuracy. Resistor R7 provides additional current limiting for LED D2.

Alternatively, the technician may adjust the system first assuring that the system is "looking at " a representative background and then adjusting potentiometer R3 until LED D2 just turns on, then backing potentiometer R3 off approximately $\frac{1}{2}$ turn. (The exact amount potentiometer R3 should be backed off depends upon dash size, color and the background and may easily be found with a small amount of trial and error.)

At time $T_2$ light beam 14 clears the scanned dash and $V_P$ returns to the background level. $V_{OUT}$ also returns to a nominal ground level and capacitor C1 begins to discharge through resistor R1 back to the reference level of VP. The time constant R1C1 is chosen with respect to the velocity of document 16 and the interdash spacing d so that capacitor C1 will substantially charge to the background reference level of $V_P$ in the time the scanner moves between dashes yet will maintain a substantially constant level for the time required to scan over a dash. The circuit has proven to be responsive down to paper speeds below 10 inches per second, and with the values for R1 and C1 shown, has proven responsive up to values approaching 150 inches per second.

Figure 5:
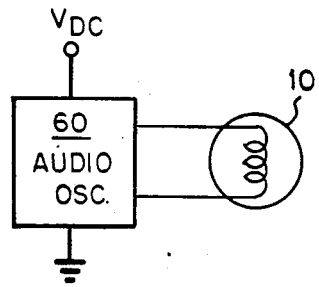
FIG. 5 is a schematic block diagram of a light source used in one embodiment of the subject invention.

Because the scanner of the subject invention is intended to be used to scan objects covering a broad spectrum of colors, light source 10 is preferably a broad spectrum incandescent light. As is known a.c. operation of incandescent lights is preferable to prolong the life of the light. However, the present inventor has found that operation of light 10 at the line frequency of 60 hertz, as is conventional, produced a sufficient 60 hertz variation in the light output to adversely effect the operation of amplifier 40. Since d.c. operation is undesirable, this problem has been overcome in the subject invention by use of a light source as shown in FIG. 5. Light source 10 is driven by audio oscillator 60 which operates at a frequency well above 60 hertz. The frequency is chosen with respect to the thermal time constant of light source 10 so as to prevent light output variations at the operating frequency from being coupled into amplifier 40. Under the operating conditions described above, operating frequency of 1,500 hertz has been found preferable.

Those skilled in the art will recognize that many other embodiments of the subject invention are within the spirit of the subject invention. In particular, an integrated circuit voltage comparator might be substituted for amplifiers U1 and U2, though experiments to date have shown that voltage comparators are somewhat more sensitive to noise on input $V_P$, or a single stage of amplification might be used effectively. Further many other amplifiers circuits equivalent to that shown could readily be developed by a person skilled in the art and such a person could find many other applications for the optical scanner system and amplifier of the subject invention. Also, optical scanners in accordance with the subject invention might be used to detect light marks against a dark background; or, equivalently, to detect the presence or absence of reflective objects. Accordingly, limitations on the subject invention are to be found only in the claims set forth below.

What is claimed is:

1. An optical scanning system comprising:
   (a) a light source;
   (b) first lens means for focusing light from said source;
   (c) means for sequentially passing objects to be scanned through said focused light;
   (d) photodetector means for producing an output representative of the intensity of light reflected from or transmitted through said object;
   (e) amplifier means having differential inputs and an output for amplifying said photodetector output;
   (f) first circuit means for rapidly coupling said photodetector output to one of said differential inputs; and
   (g) second circuit means for coupling an integral of said photodetector output to the other of said differential inputs to provide a background reference level substantially proportional to the background between said objects.

2. An optical scanning system as described in claim 1 wherein said second circuit means comprises a resistor-capacitor circuit, the time constant of said resistor-capacitor circuit being selected in accordance with the frequency with which said objects pass through said focused light and the duration said objects remain in said focused light so that the capacitor of said resistor-capacitor circuit will substantially charge to the background reference level in the times between said object and will maintain a substantially constant level for the time required to scan said objects.

3. An optical scanning system as described in claim 1 further comprising bias means for applying a bias signal to said other of said differential inputs to establish a threshold which must be exceeded by said photodetector means output before said amplifier will produce an output.

4. An optical scanning system as described in claim 1 wherein said amplifier means further comprises means for increasing the hysteresis of said amplifier means.

5. An optical scanning system as described in claim 1 wherein said light source further comprises an incandescent light and a power supply, said power supply operating at a frequency selected with respect to the thermal time constant of said incandescent light to be sufficiently high to prevent variations in the output of said incandescent light from being coupled to said amplifier.

6. An optical scanning system as described in claim 1 further comprising means connected to said amplifier means output for producing a visual signal corresponding to the state of said amplifier means output for use by an operator in adjusting said threshold.

7. An optical scanning system as described in claim 1 wherein said amplifier means further comprises:
   (e1) first differential amplifier means connected to said first and second circuit means and having sufficient gain to produce an output usable with digital logic circuits;
   (e2) second differential amplifier means having approximately unity gain and having one input connected to the output of said first differential amplifier means and the other input connected to a reference voltage source so as to clip low level noise from the output of said first differential amplifier circuit; and
   (e3) potentiometer means for providing a bias signal to said first differential amplifier circuit.

8. In a computer output mailing system of the type wherein information is scanned from control documents by an optical scanning system, an improved optical scanning system comprising:
   (a) a light source;
   (b) first lens means for focusing light from said source;
   (c) means for sequentially passing objects to be scanned through said focused light;
   (d) photodetector means for producing an output representative of the intensity of light reflected from or transmitted through said object;
   (e) amplifier means having differential inputs and an output for amplifying said photodetector output;
   (f) first circuit means for rapidly coupling said photodetector output to one of said differential inputs; and,
   (g) second circuit means for coupling an integral of said photodetector output to the other of said differential inputs.

* * * * *